(12) United States Patent
Pae et al.

(10) Patent No.: US 8,672,651 B2
(45) Date of Patent: Mar. 18, 2014

(54) FUEL PUMP MODULE WITH DRIVER EQUIPPED INSIDE FUEL TANK

(75) Inventors: Wan-Sung Pae, Daejeon (KR); Hyung-Min Kim, Chungcheongnam-do (KR); Kyeong-Hwan Kim, Daejeon (KR); Inseok Sohn, Cheongju-si (KR)

(73) Assignee: Coavis, Chungcheongnam-do (KR)

( * ) Notice: Subject to any disclaimer, the term of this patent is extended or adjusted under 35 U.S.C. 154(b) by 246 days.

(21) Appl. No.: 13/028,586

(22) Filed: Feb. 16, 2011

(65) Prior Publication Data

US 2011/0206543 A1 Aug. 25, 2011

(30) Foreign Application Priority Data

Feb. 19, 2010 (KR) .................. 10-2010-0014938

(51) Int. Cl.
*F04B 35/04* (2006.01)
(52) U.S. Cl.
USPC ............... 417/423.14; 417/423.3; 417/423.8; 123/497; 123/509; 137/565.34
(58) Field of Classification Search
USPC ................ 417/423.3, 423.14, 423.9, 423.15; 123/497, 509; 137/565.34
See application file for complete search history.

(56) References Cited

U.S. PATENT DOCUMENTS

| 5,762,049 | A | * | 6/1998 | Jones et al. ................... 123/514 |
| 5,777,410 | A | * | 7/1998 | Asakura et al. ................. 310/71 |
| 6,886,542 | B2 | * | 5/2005 | Yamada et al. ............... 123/509 |
| 7,007,678 | B2 | * | 3/2006 | Schultz et al. ................ 123/509 |
| 7,159,576 | B2 | * | 1/2007 | Yamashita et al. ........... 123/509 |
| 7,411,326 | B2 | * | 8/2008 | Achor et al. ................ 310/68 B |
| 2006/0181166 | A1 | * | 8/2006 | Saito et al. ................ 310/75 R |
| 2008/0278018 | A1 | * | 11/2008 | Achor ...................... 310/156.12 |
| 2009/0031995 | A1 | * | 2/2009 | Tateishi ....................... 123/509 |

FOREIGN PATENT DOCUMENTS

| JP | 2001214826 A | 8/2001 |
| JP | 2006161599 A | 6/2006 |
| JP | 2009036101 A | 2/2009 |
| KR | 1020090100865 A | 9/2009 |

* cited by examiner

*Primary Examiner* — Devon Kramer
*Assistant Examiner* — Charles W Nichols
(74) *Attorney, Agent, or Firm* — The Webb Law Firm (57) ABSTRACT

Provided is a fuel pump module used for a car, and more particularly, to a fuel pump module with a driver equipped inside a fuel tank capable of solving a problem of space limitation due to the installation of the driver by disposing the driver for controlling a BLDC fuel pump between a flange and a reservoir and mounting it in the fuel tank, minimizing the degradation in performance of the BLDC fuel pump caused by voltage drop and efficiency degradation due to a wire by reducing a length of a wire for electrically connecting the driver with the BLDC fuel pump, and achieving a sufficient heat radiation effect by directly transferring the heat energy generated from electrical devices such as FET, MCU, or the like, mounted in the driver to the fuel in the fuel tank through the case cover.

8 Claims, 12 Drawing Sheets

FIG. 1

PRIOR ART

FUEL PUMP MODULE WITH DRIVER EQUIPPED INSIDE FUEL TANK

CROSS-REFERENCE TO RELATED APPLICATIONS

This application claims priority under 35 U.S.C. §119 to Korean Patent Application No. 10-2010-0014938, filed on Feb. 19, 2010, in the Korean Intellectual Property Office, the disclosure of which is incorporated herein by reference in its entirety.

TECHNICAL FIELD

The present invention relates to a fuel pump module used for a car, and more particularly, to a fuel pump module with a driver equipped inside a fuel tank capable of solving a problem of space limitation due to the installation of the driver by disposing the driver for controlling a brushless direct current (BLDC) fuel pump between a flange and a reservoir and mounting it in the fuel tank, minimizing degradation in performance of the BLDC fuel pump caused by a voltage drop and efficiency degradation due to a wire by reducing a length of a wire for electrically connecting the driver with the BLDC fuel pump, and achieving a sufficient heat radiation effect by directly transferring the heat energy generated from electrical devices such as FET, MCU, or the like, mounted in the driver to the fuel in the fuel tank through the case cover.

BACKGROUND

Figure 1:
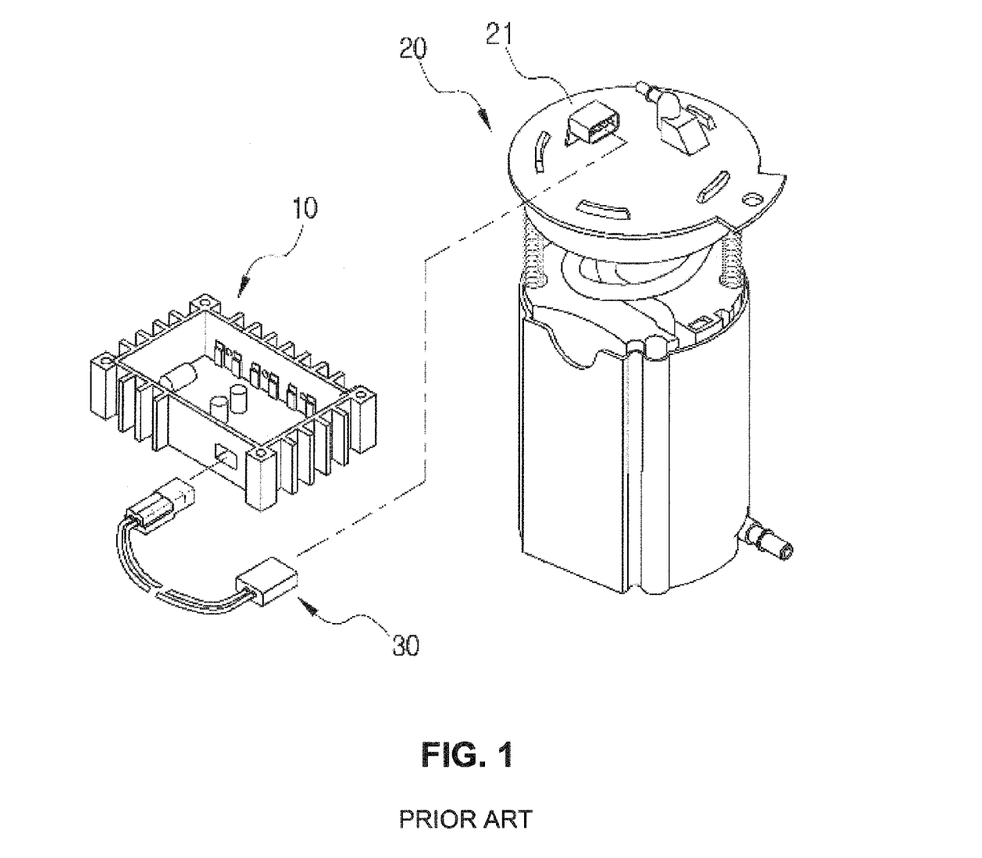
FIG. 1 is an exploded perspective view of a driver of the related art, a BLDC fuel pump module, and a connector for electrically connecting the driver with the BLDC fuel pump module.

FIG. 1 shows an exploded perspective view of a driver 10 according to the related art, a BLDC fuel pump module 20, and a connector 30 for electrically connecting the driver 10 and the BLDC fuel pump module 20.

In order to drive a BLDC pump operated by a BLDC motor, there is a need for a control device referred to as the driver 10 for controlling a conducting sequence of current applied to each of the phases U, V, and W and Rpm.

The BLDC fuel pump module 20 is fastened to the fuel tank (not shown) in a state where the top surface of the flange 21 is exposed to the outside of the fuel tank (not shown) and the remaining components are installed to be disposed in the fuel tank (not shown).

In the related art, the BLDC fuel pump module 20 supplying necessary pressure and flux to an engine separates from the driver 10, thereby causing problems in limitation in an installation position and a distance due to a length of a power supplying wire 30 for electrically connecting between the driver 10 and the BLDC fuel pump module 20 and efficiency degradation due to the voltage drop of the wire 30, when the driver is applied to a vehicle.

In addition, in the related art, the driver 10 is mounted on the outside of the vehicle, such that it is exposed to vibrations of a vehicle or foreign materials (moisture, dust, etc.). Therefore, the related art increases costs for handling the above-mentioned problems and needs countermeasures against EMC.

SUMMARY

An object of the present invention is to provide a fuel pump module with a driver equipped inside a fuel tank capable of solving a problem of space limitation due to the installation of the driver by disposing the driver between a flange and a reservoir and mounting it in the fuel tank, minimizing degradation in performance of the BLDC fuel pump caused by a voltage drop and efficiency degradation due to a wire by reducing a length of a wire for electrically connecting the driver with the BLDC fuel pump, and achieving a sufficient heat radiation effect by directly transferring the heat energy generated from electrical devices such as FET, MCU, or the like, mounted in the driver to the fuel in the fuel tank through the case cover.

According to an exemplary embodiment of the present invention, there is provided a BLDC fuel pump module including a flange having the top surface exposed to the outside and fastened to a fuel tank, a support bar having the top end connected to the bottom end of the flange and extended downward, and a reservoir connected to the bottom end of the support bar and including a BLDC fuel pump embedded therein, the BLDC fuel pump module including: driver cases disposed between the flange and the reservoir and mounted in the fuel tank; a driver embedded in the driver cases to control the BLDC fuel pump; a first connector housing provided in the driver cases and seated with a first connector supplying power applied through the flange to the driver; and a second connector housing provided in the driver cases and seated with a second connector electrically connecting the driver with the BLDC fuel pump.

The driver cases may include a case main body having an opened bottom surface so that the driver can be installed into the case main body so as to be assembled and a case cover disposed at the bottom portion of the driver and fastened to the bottom surface of the case main body, and epoxy is filled between the top surface of the driver and the inner top surface of the case main body through an epoxy injection hole formed in the driver in order to prevent the injection of fuel.

The BLDC fuel pump module may further include: a fastening protrusion formed on the bottom circumferential surface of the case main body; and an elastic fastening plate protruded upward from the edge of the case cover, provided with a fastening groove fastened to the fastening protrusion, and made of an elastic material to apply an elastic force in the bottom circumferential direction of the case main body.

The case cover may be fastened to the case main body by heat-caulking the cover fastening part formed to be protruded on the bottom end of the case main body.

The bottom end of the case main body may be provided with a ring insertion groove, and the ring insertion groove is provided with an elastic ring of an elastic material mounted so that the case main body is closely fastened to the case cover.

The case cover may be made of an aluminum material or a stainless steel (SUS) material in order to efficiently discharge heat generated from electrical devices mounted in the driver to the outside.

The first connector housing and the second connector housing may be each formed on the top surface or the side of the driver case.

The BLDC fuel pump module may further include: a top support bar guide pipe formed in the driver cases in order to guide the support bar while being inserted with the support bar; an intank filter formed with a bottom support bar guide pipe to guide the support bar passing through the top support bar guide pipe while being inserted with the support bar and mounted with the BLDC fuel pump; a top support bar spring inserted into the support bar and having the top end elastically contacting the flange and the bottom end elastically contacting the top end of the top support bar guide pipe; and a bottom support bar spring inserted into the support bar and having the top end elastically contacting the bottom end of the top support bar guide pipe and the bottom end elastically contacting the top end of the bottom support bar guide pipe.

The BLDC fuel pump module may further include: a sub-support bar insertion pipe formed in the driver cases and having the closed top end and the opened bottom end; a sub-support bar guide pipe formed in the intank filter and having the opened top and bottom ends; a sub-support bar guided while being inserted into the sub-support bar guide pipe and having the top end inserted into the sub-support bar insertion pipe; and a sub-support bar spring inserted into the sub-support bar and having the top end elastically contacting the bottom end of the sub-support bar insertion pipe and the bottom end elastically contacting the top end of the sub-support bar guide pipe.

DETAILED DESCRIPTION OF EMBODIMENTS

Hereinafter, an exemplary embodiment of the present invention will be described in detail with reference to the accompanying drawings.

Figure 2:
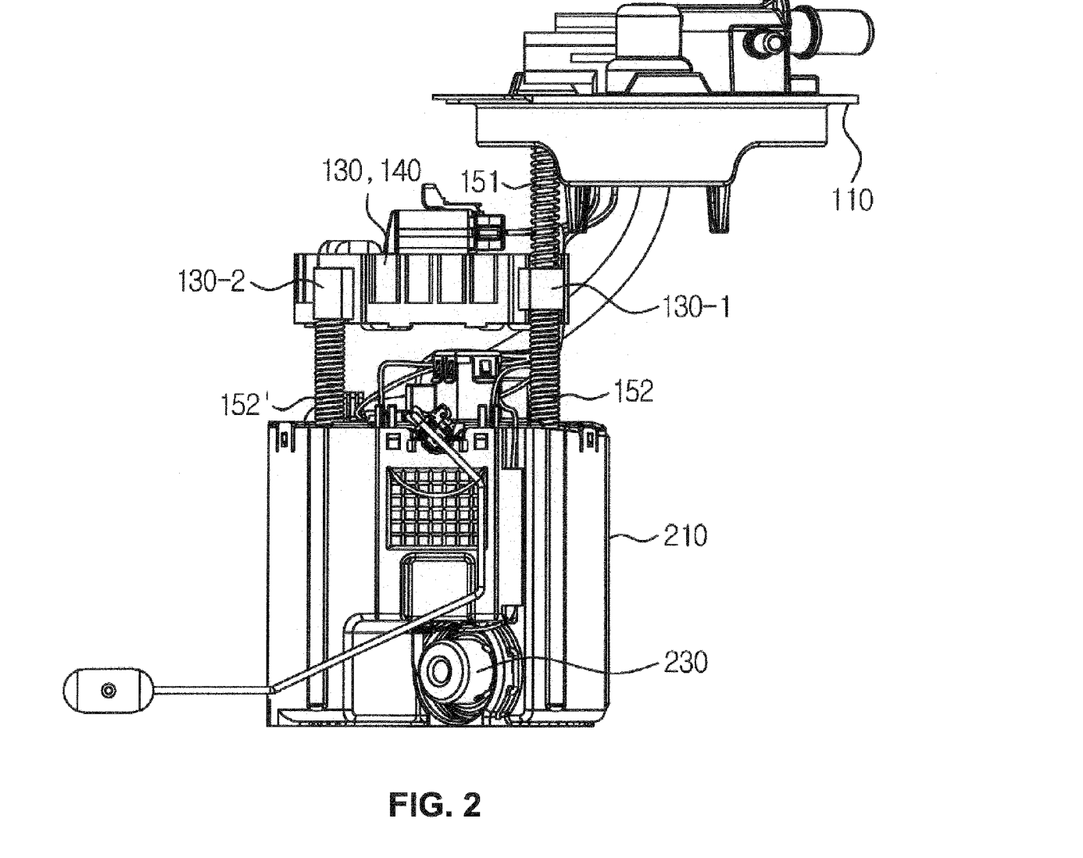
FIG. 2 is a perspective view of an exemplary embodiment of the present invention.
Figure 3:
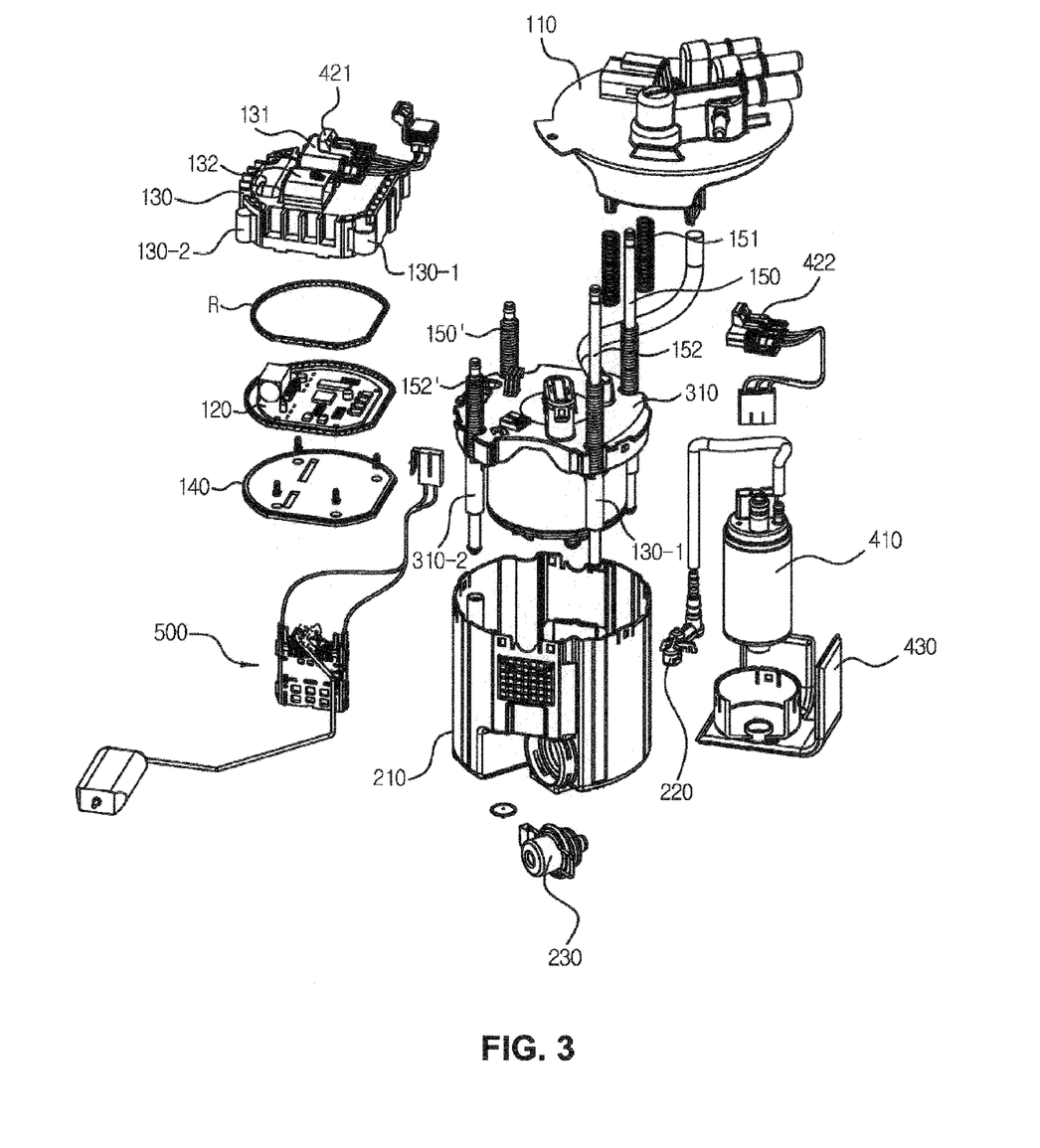
FIG. 3 is an exploded perspective view of the exemplary embodiment of the present invention.
Figure 6:
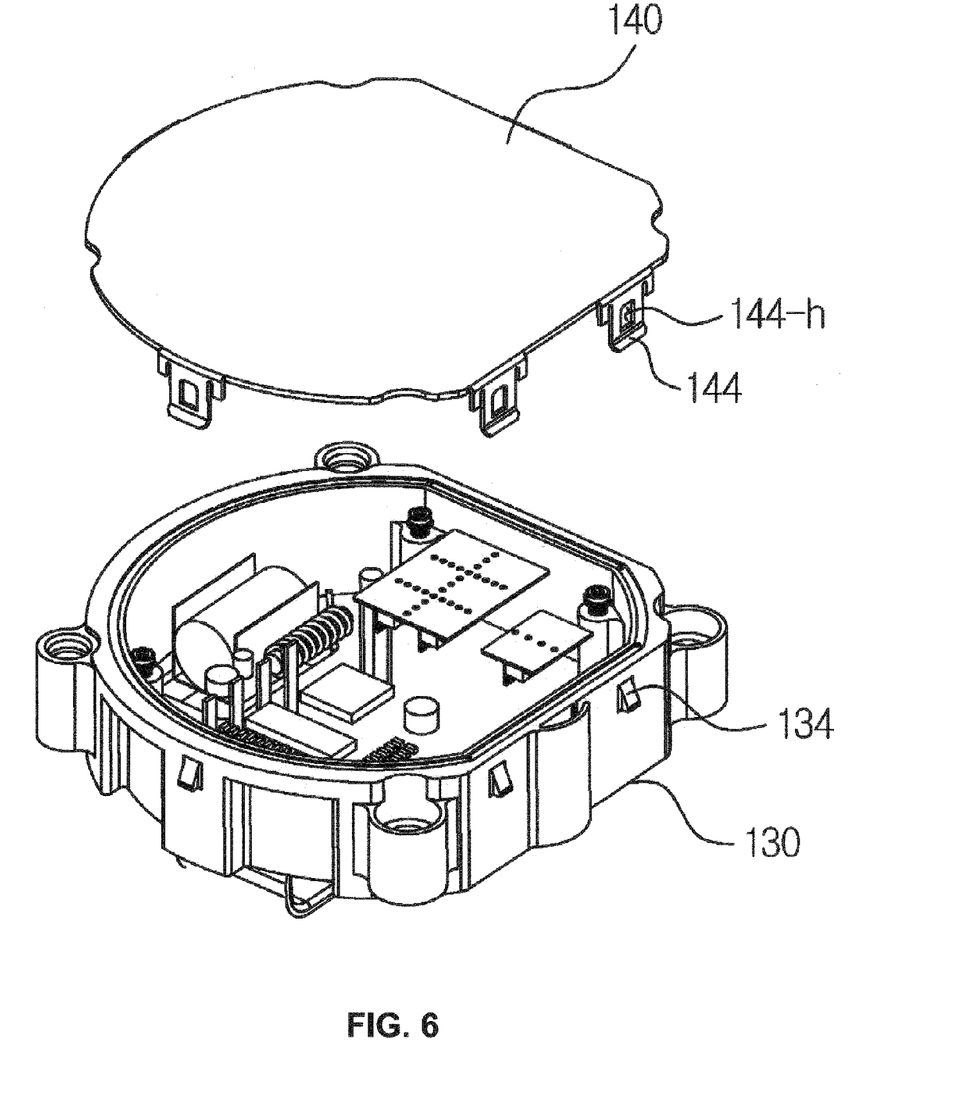
Figure 7:
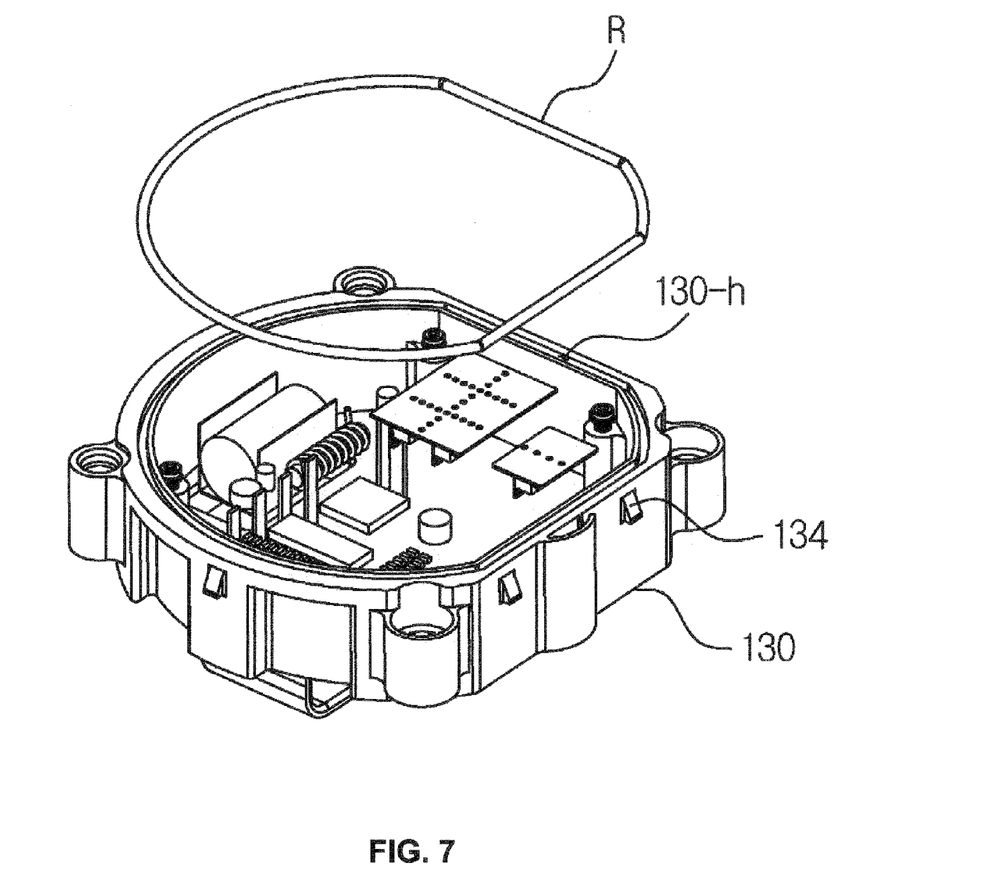
Figure 8:
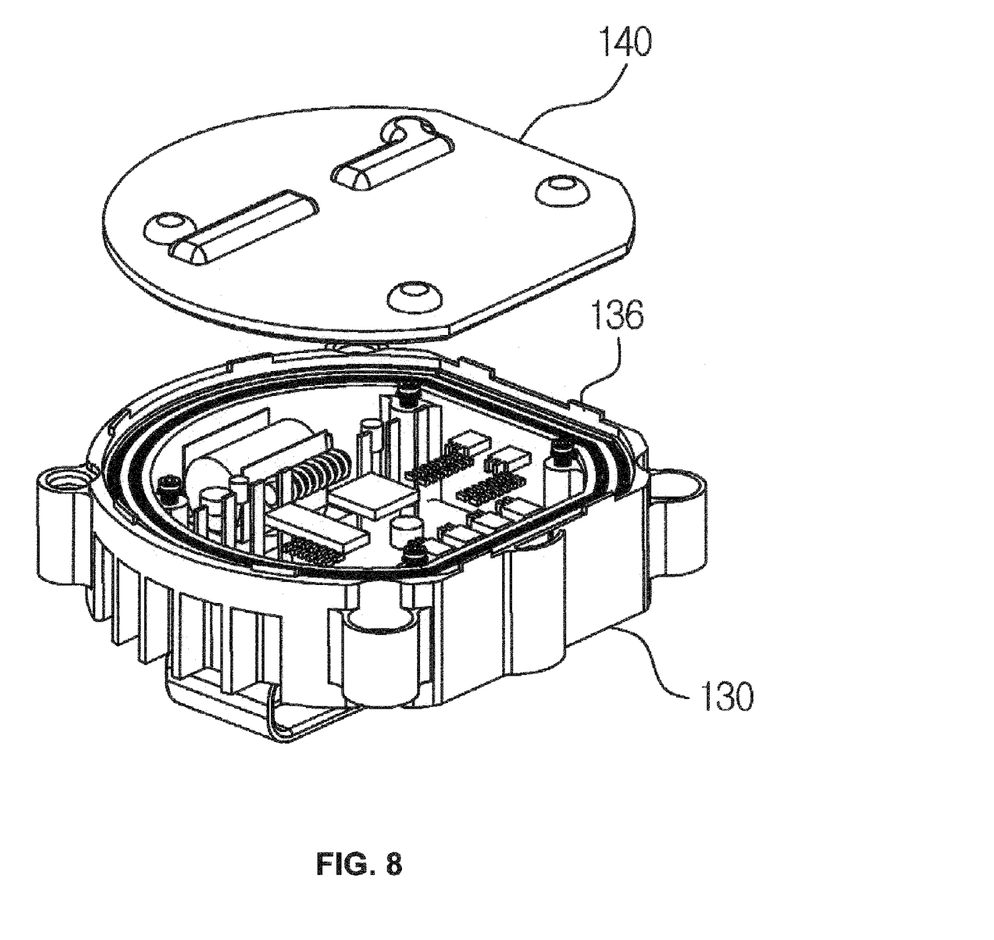
FIGS. 8 and 9 are rear perspective views of main components of another exemplary embodiment of the present invention.
Figure 9:
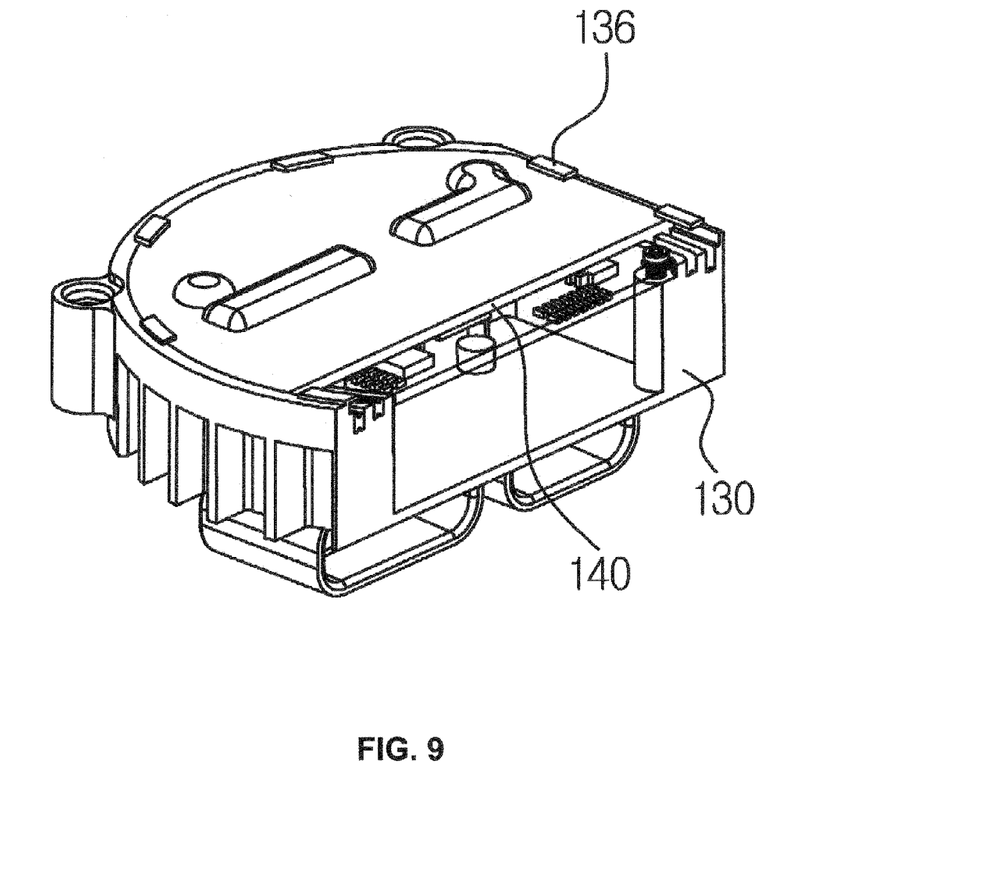
Figure 10A:
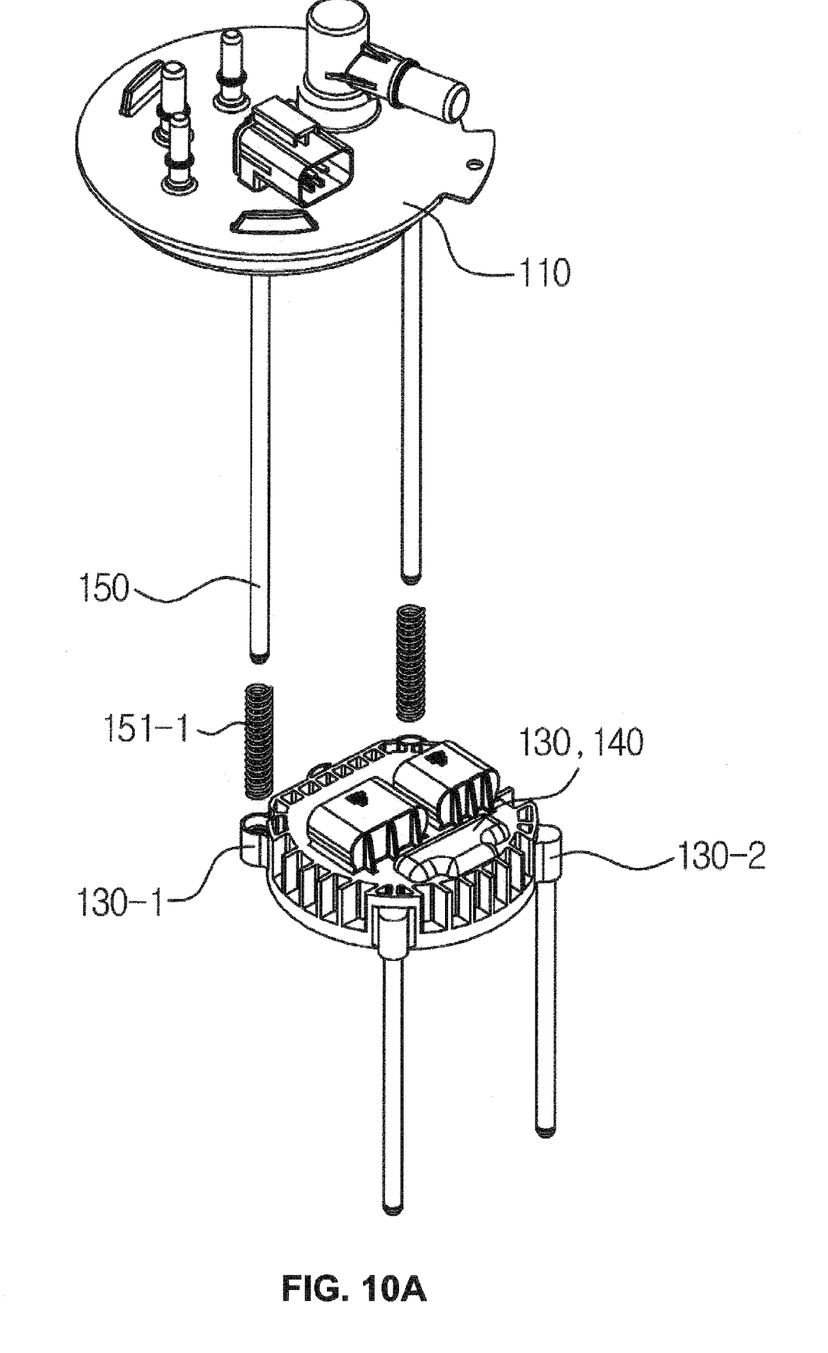
FIGS. 10A to 10C are assembling process diagrams of main components of the exemplary embodiment of the present invention.
Figure 10B:
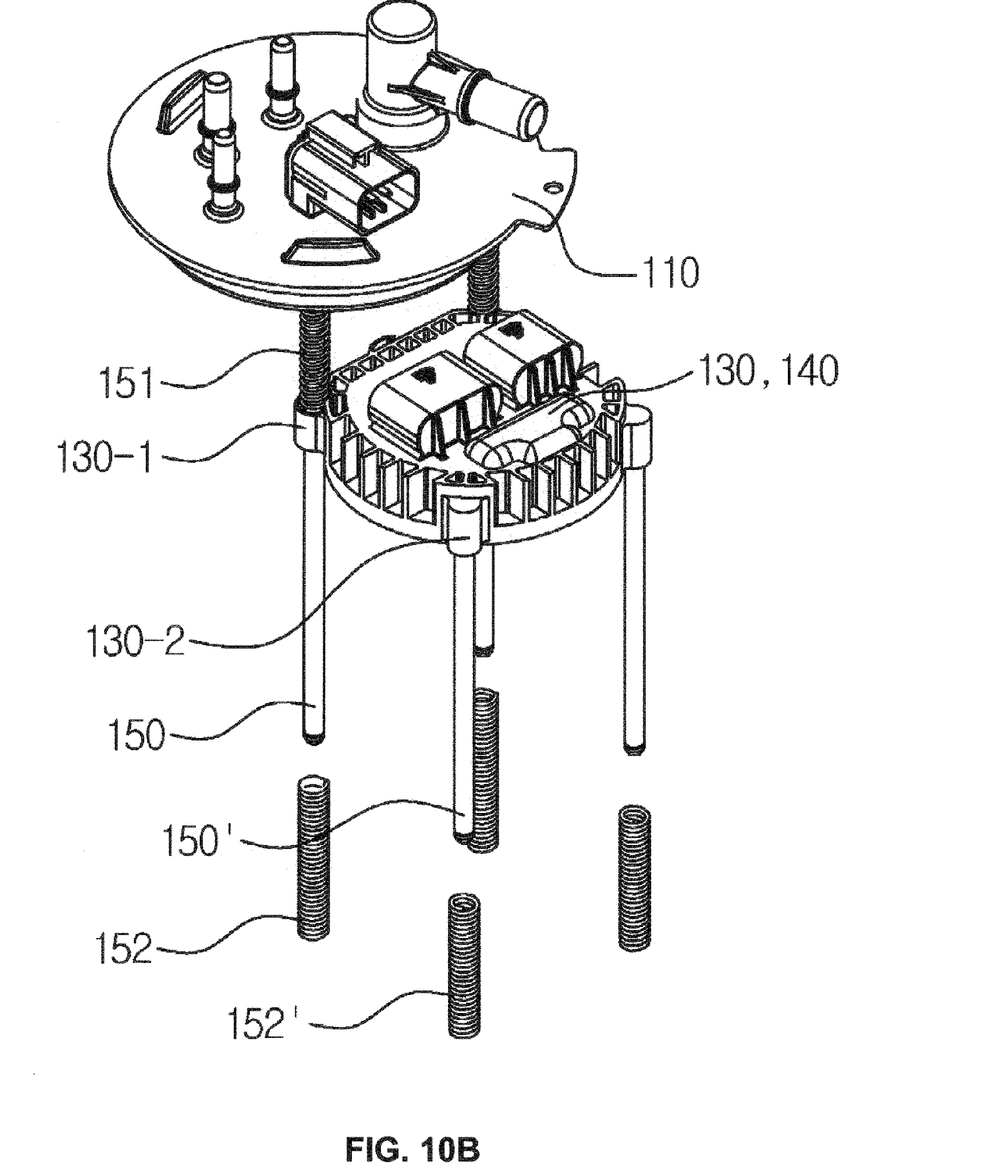
Figure 10C:
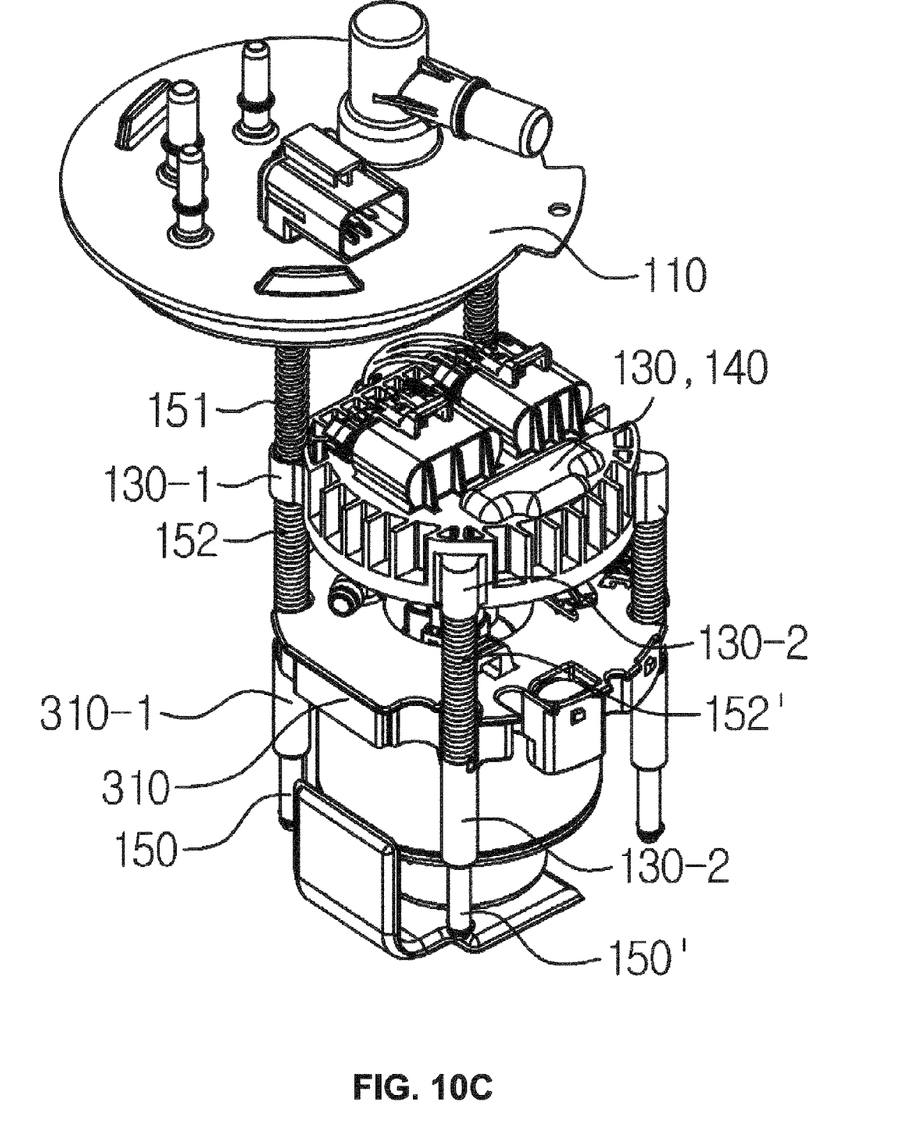

FIG. 2 is a perspective view of an exemplary embodiment of the present invention, FIG. 3 is an exploded perspective view of the exemplary embodiment of the present invention, FIGS. 4 to 7 are rear perspective views of main components of the exemplary embodiment of the present invention, FIGS. 8 and 9 are rear perspective views of main components of another exemplary embodiment of the present invention, and FIGS. 10A to 10C are assembling process diagrams of main components of the exemplary embodiment of the present invention.

Referring to FIGS. 2 and 3, the exemplary embodiment of the present invention may be configured to include a flange 110, driver cases 130 and 140, a reservoir 210, an intank filter 310, and a BLDC fuel pump 410.

Although not shown in FIGS. 2 and 3, the flange 110 is fastened to a fuel tank (not shown) so that the top surface thereof is exposed to the outside of the fuel tank (not shown) and the bottom surface thereof is disposed in the fuel tank (not shown).

Referring to FIG. 2, the driver cases 130 and 140 are disposed between the flange 110 and the reservoir 210 and are mounted in the fuel tank (not shown).

Referring to FIG. 3, the driver cases 130 and 140 include a case main body 130 and a case cover 140.

Figure 4:
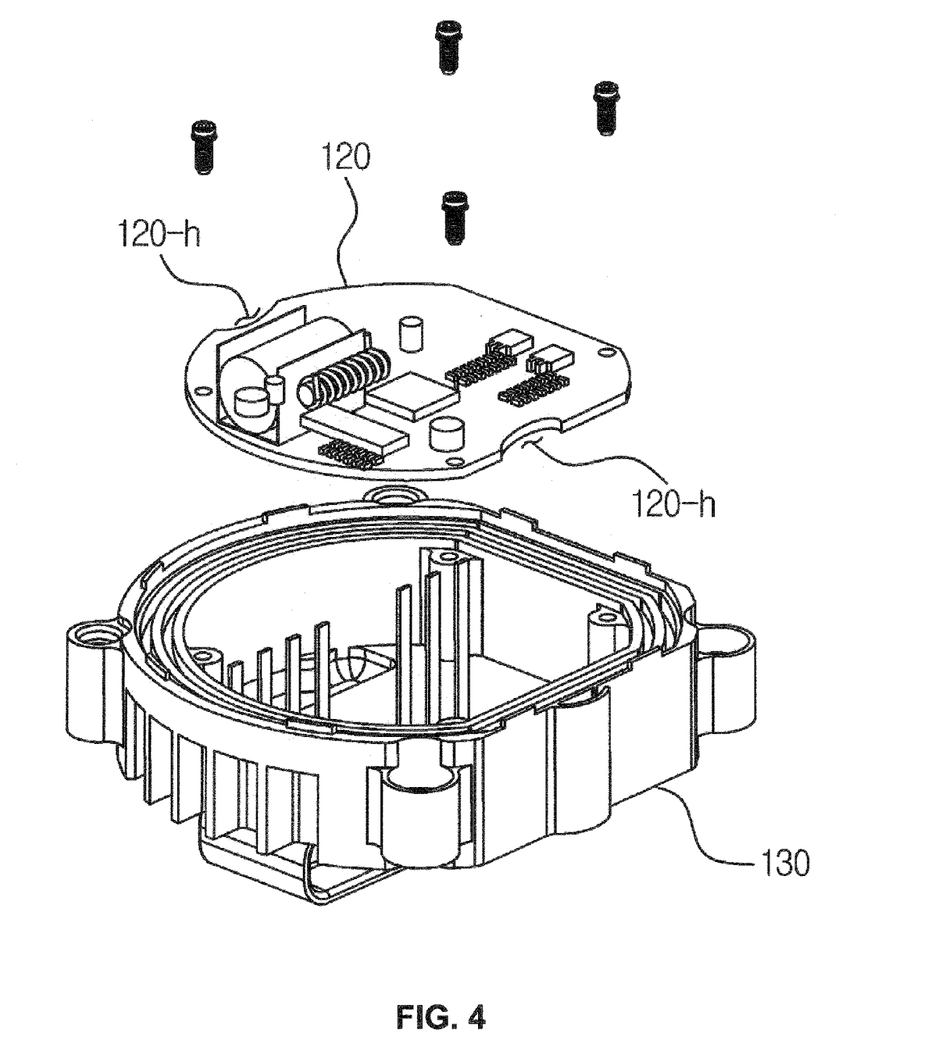
FIGS. 4 to 7 are rear perspective views of main components of the exemplary embodiment of the present invention.
Figure 5:
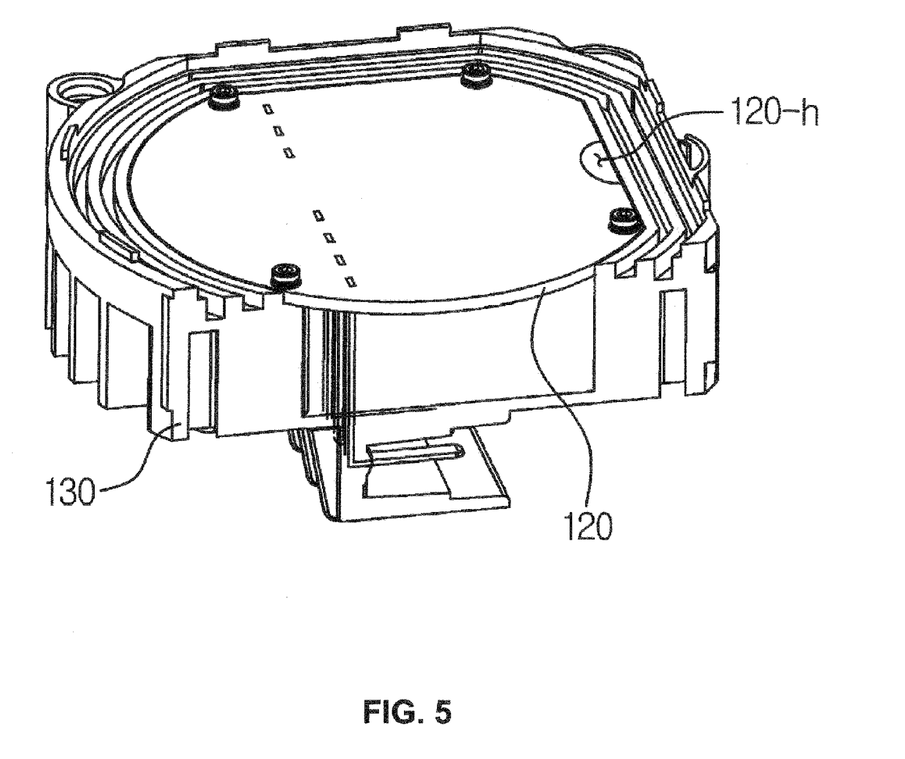

Referring to FIGS. 4 and 5, in order to enter the driver 120 into the case main body 130 to be assembled, the bottom surface of the case main body 130 is opened. The driver 120 is a control device controlling the BLDC fuel pump 410. The driver 120 may be a PCB in which predetermined electrical devices for controlling the BLDC fuel pump 410 are mounted. Meanwhile, the driver 120 is provided with an epoxy injection hole 120-$h$. The epoxy injection hole 120-$h$ may be formed at an edge of the driver 120. Epoxy is filled between the top surface of the driver 120 and the inner top surface of the case main body 130 through the epoxy injection hole 120-$h$. Due to the filling of epoxy, it is possible to prevent the fuel in the fuel tank (not shown) from permeating between the top surface of the driver 120 and the inner top surface of the case main body 130. In addition, the epoxy is filled in the case main body 130 and as described below, a top support bar spring 151 and a bottom support bar spring 152 are inserted into a support bar 150 and a sub-support bar spring 152' is inserted into a sub-support bar 150', such that the driver is not almost affected by the vibrations of a vehicle. The epoxy may be filled to cover the bottom surface of the driver 120. Meanwhile, according to the exemplary embodiment of the present invention, the driver 120 is mounted in the fuel tank (not shown) without being mounted on the outside of the vehicle, such that it has sufficient stability against EMC.

Referring to FIGS. 3 and 6, the case cover 140 is disposed at the bottom portion of the driver 120 and is fastened to the bottom surface of the case main body 130. That is, the case cover 140 is fastened to the bottom end of the driver 120 after the epoxy is filled between the top surface of the driver 120 and the inner top surface of the case main body 130. The case cover 140 is fastened to the bottom end of the driver 120, such that the driver 120 is sealed from the outside to be protected.

Referring to FIG. 6, the bottom circumferential surface of the case main body 130 is provided with fastening protrusions 134.

Referring to FIG. 6, the case cover 140 is provided with an elastic fastening plate 144 to be protruded upward along an edge thereof. The elastic fastening plate 144 is provided with a fastening groove 144-$h$ fastened to the fastening protrusion 134. The elastic fastening plate 144 is made of an elastic material to apply an elastic force to the bottom circumferential surface of the case main body 130. That is, the elastic fastening plate 144 is closely attached to the bottom circumferential surface of the case main body 130 by elastic force in the state where it is fastened to the fastening protrusion 134, such that the fastening force between the case main body 130 and the case cover 140 is maintained.

Meanwhile, the case cover 140 is made of a material having large thermal conductivity to radiate heat, preferably, an aluminum material or an SUS material. As the case cover 140 is made of the aluminum material or the SUS material, the heat radiation of the case cover 140 is improved, such that the heat generated due to electrical devices such as FET, MCU, etc., mounted in the driver 120 is effectively discharged to the outside.

Referring to FIG. 7, the bottom end of the case main body 130 may be provided with a ring insertion groove 130-$h$. The ring insertion groove 130-$h$ is inserted with an elastic ring R of an elastic material. The case main body 130 is more closely attached to the case cover 140 by inserting the elastic ring R into the ring insertion groove 130-$h$, such that the possibility of fuel permeating into the fuel tank (not shown) is further reduced. The elastic ring R may be made of a rubber material.

Referring to FIG. 3, the top surface of the case main body 130 is provided with a first connector housing 131 and a second connector housing 132. Differently from FIG. 3, any one or both of the first connector housing 131 and the second connector housing 132 may be provided on the side of the case main body 130.

The first connector housing 131 is seated with the first connector (not shown). The first connector (not shown) is a connector for supplying power applied through the flange 110 to the driver 120. That is, referring to FIG. 3, one side of the first connector module 421 is connected with the flange 110 and the other side thereof is inserted into the first connector housing 131, such that the power applied through the flange 110 is supplied to the driver 120.

The second connector housing 132 is seated with the second connector (not shown). The second connector (not shown) is a connector for electrically connecting the driver 120 with the BLDC fuel pump 410. That is, referring to FIG. 3, one side of the second connector module 422 is connected to the second connector housing 132 and the other side thereof is connected to the BLDC fuel pump 410, such that the driver 120 is electrically connected with the BLDC fuel pump 410.

Referring to FIG. 3, the intank filter 310 is mounted in the reservoir 210 and the receiving groove (not shown) formed at the central portion of the intank filter 310 is mounted with the BLDC fuel pump 410. The BLDC fuel pump 410 is a BLDC pump driven by a BLDC driver.

Referring to FIG. 3, the bottom surface of the reservoir 210 is mounted with a check valve 220. In addition, a regulator 230 is mounted from the outside of the reservoir 210, such that the end of the regulator 230 is disposed in the reservoir 210. The end of the regulator 230 is connected to the intank filter 310 and some of the fuel supplied to the engine from the intank filter 310 may be returned to the reservoir 210 through the regulator 230. In addition, when some of the fuel supplied to the engine from the intank filter 310 is returned to the reservoir 210 through the regulator 230, the end of the regulator 230 may communicate with the fuel tank (not shown) through a connection pipe (not shown) so that the fuel in the fuel tank (not shown) may be injected into the reservoir by an orifice effect.

Referring to FIG. 3, the bottom end of the BLDC fuel pump 410 is mounted with a primary filter 430. The primary filter 430 filters the fuel in the reservoir 210 and then, injects it into the BLDC fuel pump 410. That is, the fuel passing through the primary filter 430 is absorbed through the BLDC fuel pump 410, filtered through the intank filter 310, and then, supplied to the engine.

Reference numeral 500 indicates a fuel gage module, which is connected to the reservoir 210 to be seated into the fuel tank (not shown).

Referring to FIGS. 3 and 10A to 10C, the bottom surface of the flange 110 is connected with the top end of the support bar 150.

Referring to FIGS. 2, 3, and 10A to 10C, the driver cases 130 and 140 are mounted with a top support part guide pipe 130-1 to guide the support bar 150 while being inserted with the support bar 150. The top support bar guide pipe 130-1 may be formed on the outer circumferential surface of the case main body 130 and is formed to open the top and bottom ends thereof.

Referring to FIGS. 3 and 10C, the intank filter 310 is provided with a bottom support bar guide pipe 310-1 mounted with the BLDC fuel pump 410. The bottom support bar guide pipe 310-1 may be formed on the outer circumferential surface of the intank filter 310 and is formed to open the top and bottom ends thereof. The bottom support bar guide pipe 310-1 is to guide the support bar 150 passing through the top support bar guide pipe 130-1 while being inserted with the support bar 150.

Referring to FIGS. 2, 3, and 10A to 10C, the top portion of the support bar 150 is inserted with a top support bar spring 151. The top end of the top support bar spring 151 is mounted to elastically contact the flange 110 and the bottom end thereof is mounted to elastically contact the top end of the top support bar guide pipe 130-1.

Referring to FIGS. 2, 3, and 10A to 10C, the bottom portion of the support bar 150 is inserted with the bottom support bar spring 152. The top end of the bottom support bar spring 152 elastically contacts the bottom end of the top support bar guide pipe 130-1 and the bottom end thereof elastically contacts the top end of the bottom support bar guide pipe 130-1.

Referring to FIGS. 2, 3, and 10A to 10C, the driver cases 130 and 140 are mounted with a sub-support bar insertion pipe 130-2 of which the top end is closed and the bottom end is opened.

The sub-support bar insertion pipe 130-2 may be formed at the outer circumferential surface of the case main body 130.

Referring to FIGS. 3 and 10C, the intank filter 310 is provided with a sub-support bar guide pipe 310-2. The sub-support bar guide pipe 310-2 may be formed on the outer circumferential surface of the intank filter 310 and is formed to open the top and bottom ends thereof.

Referring to FIGS. 3 and 10B to 10C, the sub-support bar guide pipe 310-2 guides a sub-support bar 150' while being inserted with the sub-support bar 150'. Meanwhile, the top end of the sub-support bar 150' may be inserted into the sub-support bar inserting pipe 130-2.

Referring to FIGS. 2, 3, and 10B to 10C, the sub-support bar spring 152' is inserted into the sub-support bar 150'. The top end of the sub-support bar spring 152' elastically contacts the bottom end of the sub-support bar insertion pipe 130-2 and the bottom end thereof elastically contacts the top end of the sub-support bar guide pipe 310-2.

Meanwhile, each of the bottom ends of the support bar 150 and the sub-support bar 150' are fixedly mounted to the reservoir 210. That is, the reservoir body assembly (not shown) including the reservoir 210, the intank filter 310, the BLDC fuel pump 410, etc., is fastened to the flange 110 through the support bar 150 to be fixedly mounted in the fuel tank.

FIGS. 2, 3, and 10A to 10C show that each of the support bar 150 and the sub-support bar 150' is two of each, but the number thereof is not limited thereto. For example, each of the support bar 150 and the sub-support bar 150' may be three of each.

Referring to FIG. 10C, the above-mentioned exemplary embodiment relieves vibrations by the top support bar spring 151 inserted into the support bar 150 and the sub-support bar spring 152' inserted into the bottom support bar spring 152 and the sub-support bar 150' when the vehicle is vibrating, such that the driver 120 mounted in the driver cases 130 and 140 is not almost affected by the vibrations of the vehicle.

Meanwhile, referring to FIGS. 8 and 9, another exemplary embodiment of the present invention may protrudedly form a cover fastening part 136 on the bottom end of the case main body 130 in order to fasten the case main body 130 to the case cover 140. The case main body 130 is mutually fastened to the case cover 140 by heat-caulking the cover fastening part 136 on the bottom surface of the case cover 140 in the state where the case cover 140 is closely attached to the bottom end of the case main body 130.

Hereinafter, the operation of the exemplary embodiment will be described.

The exemplary embodiment solves the problem of space limitation due to the installation of the driver 120 in the vehicle since the driver 120 is mounted in the fuel tank (not shown).

In addition, the exemplary embodiment reduces the length of the wire for electrically connecting the driver 120 with the BLDC fuel pump 410 since the driver 120 is disposed between the flange 110 and the reservoir 210 and is mounted in the fuel tank (not shown). Therefore, the exemplary embodiment can minimize the degradation in performance of the BLDC fuel pump 410 caused by the voltage drop and the efficiency degradation due to the wire for electrically connecting the driver 120 with the BLDC fuel pump 410.

In addition, according to the exemplary embodiment, the driver 120 can have the sufficient stability against the EMC and is not almost affected by the vibrations of the vehicle since the driver 120 is disposed between the flange 110 and the reservoir 210 and is mounted in the fuel tank (not shown), the epoxy is filled in the driver cases 130 and 140, the top support bar spring 151 and the bottom support bar spring 152 are inserted into the support bar 150, and the sub-support bar spring 152' is inserted into the sub-support bar 150'.

Moreover, the exemplary embodiment can prevent the fuel in the fuel tank (not shown) from permeating into the driver 120 since the epoxy having oil resistance is filled in the driver cases 130 and 140.

Further, according to the exemplary embodiment, the case cover 140 is made of the aluminum material or the SUS material to directly transfer the heat energy generated from the electrical devices such as FET, MCU, or the like, mounted in the driver 120 to the fuel in the fuel tank (not shown) through the case cover 140, thereby making it possible to achieve the sufficient heat radiation effect.

The present invention can solve the problem of space limitation due to the installation of the driver when being mounted in the vehicle by mounting the driver in the fuel tank.

The present invention can reduce the length of the wire for electrically connecting the driver with the BLDC fuel pump by mounting the driver between the flange and the reservoir and mounting it in the fuel tank. Therefore, the present invention can minimize degradation in performance of the BLDC fuel pump caused by the voltage drop and efficiency degradation due to the wire for electrically connecting the driver with the BLDC fuel pump.

The present invention can provide sufficient stability against the EMC by disposing the driver between the flange and the reservoir and mounting it in the fuel tank and allow the driver not to be affected by the vibrations of the vehicle by filling the epoxy in the driver cases, inserting the top support bar spring and the bottom support bar spring into the support bar, and inserting the sub-support bar spring into the sub-support bar.

The present invention can prevent the fuel in the fuel tank from being permeated into the driver by filling epoxy having oil resistance into the driver cases.

The present invention includes the case cover of the aluminum material or the SUS material to directly transfer the heat energy generated from the electrical devices such as FET, MCU, or the like, mounted in the driver to the fuel in the fuel tank (not shown) through the case cover, thereby making it possible to achieve a sufficient heat radiation effect.

The present invention is not limited to the embodiment described herein and it should be understood that the present invention may be modified and changed in various ways without departing from the spirit and the scope of the present invention. Therefore, it should be appreciated that the modifications and changes are included in the claims of the present invention.

What is claimed is:

1. A brushless direct current fuel pump module including a flange having the top surface exposed to the outside and fastened to a fuel tank, a support bar having the top end connected to the bottom end of the flange and extended downward, and a reservoir connected to the bottom end of the support bar and including a brushless direct current fuel pump embedded therein, the brushless direct current fuel pump module comprising:
   driver cases disposed between the flange and the reservoir and mounted in the fuel tank;
   a driver embedded in the driver cases to control the brushless direct current fuel pump;
   a first connector housing provided in the driver cases and seated with a first connector supplying power applied through the flange to the driver;
   a second connector housing provided in the driver cases and seated with a second connector electrically connecting the driver with the brushless direct current fuel pump;
   a top support bar guide pipe formed in the driver cases in order to guide the support bar while being inserted with the support bar;
   an intank filter formed with a bottom support bar guide pipe while being inserted with the support bar and mounted with the brushless direct current fuel pump;
   a top support bar spring inserted into the support bar and having the top end elastically contacting the flange and the bottom end elastically contacting the top end of the top support bar guide pipe; and
   a bottom support bar spring inserted into the support bar and having the top end elastically contacting the bottom end of the top support bar guide pipe and the bottom and elastically contacting the top end of the bottom support bar guide pipe.

2. The brushless direct current fuel pump module of claim 1, wherein the driver cases include a case main body having an opened bottom surface so that the driver enters into the case main body to be assembled and a case cover disposed at the bottom portion of the driver and fastened to the bottom surface of the case main body, and
   epoxy is filled between the top surface of the driver and the inner top surface of the case main body through an epoxy injection hole formed in the driver in order to prevent permeation of fuel.

3. The brushless direct current fuel pump module of claim 2, further comprising:
   a fastening protrusion formed on the bottom circumferential surface of the case main body; and
   an elastic fastening plate protruded upward from the edge of the case cover, provided with a fastening groove fastened to the fastening protrusion, and made of an elastic material to apply an elastic force in the bottom circumferential direction of the case main body.

4. The brushless direct current fuel pump module of claim 2, wherein the case cover is fastened to the case main body by heat-caulking the cover fastening part formed to be protruded on the bottom end of the case main body.

5. The brushless direct current fuel pump module of claim 2, wherein the bottom end of the case main body is provided with a ring insertion groove, and
   the ring insertion groove is provided with an elastic ring of an elastic material mounted so that the case main body is closely fastened to the case cover.

6. The brushless direct current fuel pump module of claim 2, wherein the case cover is made of an aluminum material or an stainless steel material in order to efficiently discharge heat generated from electrical devices mounted in the driver to the outside.

7. The brushless direct current fuel pump module of claim 1, wherein the first connector housing and the second connector housing are each formed on the top surface or the side of the driver case.

8. The brushless direct current fuel pump module of claim 1, further comprising:
- a sub-support bar insertion pipe formed in the driver cases and having the closed top end and the opened bottom end;
- a sub-support bar guide pipe formed in the intank filter and having the opened top and bottom ends;
- a sub-support bar guided while being inserted into the sub-support bar guide pipe and having the top end inserted into the sub-support bar insertion pipe; and
- a sub-support bar spring inserted into the sub-support bar and having the top end elastically contacting the bottom end of the sub-support bar insertion pipe and the bottom end elastically contacting the top end of the sub-support bar guide pipe.

* * * * *